UNITED STATES PATENT OFFICE.

OSCAR BALLY AND MAX HENRY ISLER, OF MANNHEIM, GERMANY, ASSIGNORS TO BADISCHE ANILIN & SODA FABRIK, OF LUDWIGS-HAFEN-ON-THE-RHINE, GERMANY, A CORPORATION.

ANTHRACENE DYE AND PROCESS OF MAKING SAME.

No. 820,379.  Specification of Letters Patent.  Patented May 8, 1906.

Original application filed January 31, 1905, Serial No. 243,571. Divided and this application filed October 11, 1905. Serial No. 282,356.

*To all whom it may concern:*

Be it known that we, OSCAR BALLY, doctor of philosophy and chemist, and MAX HENRY ISLER, chemist, citizens of the Swiss Republic, residing at Mannheim, in the Grand Duchy of Baden, German Empire, have invented certain new and useful Improvements in Anthracene Dyes and Processes of Making the Same, (which invention is divided, pursuant to the requirement of the Patent Office, out of United States Letters Patent dated January 9, 1906, No. 809,892,) of which the following is a specification.

New compounds of the anthracene series containing a benzanthrone group can be obtained by condensing certain anthracene compounds with glycerin. (See Letters Patent Nos. 786,085, 787,859, and 798,104.) We have discovered that these new benzanthrones upon being treated with caustic alkali yield valuable coloring-matters possessing dyeing properties similar to those of indanthrene, and we have described this invention in United States Letters Patent dated January 9, 1906, No. 809,892, which contains generic claims for coloring-matters which can be produced by treating a benzanthrone with caustic alkali and also for the process for producing the same.

In the present application we make no generic claim for the production of coloring-matters from benzanthrones and for the coloring-matters themselves, but we wish to claim specifically the coloring-matters obtainable by treating with caustic alkali a benzanthrone which can be obtained by condensing with glycerin a naphthanthraquinone body (as described in the specification of Letters Patent No. 798,104) and the process for producing these coloring-matters, which are soluble in concentrated sulfuric acid, giving olive-green solutions. They also dissolve in alkaline hydrosulfite, yielding reddish-brown vats with a strong fluorescence, which dye vegetable fiber substantively giving red-blue to green-blue shades. In particular, the coloring-matter obtainable from naphthanthraquinone yields a fuchsin-red vat with alkaline hydrosulfite.

The following examples will serve to further illustrate the nature of our invention, which, however, is not confined to these examples. The parts are by weight:

Example 1: Mix together ten (10) parts of the portion soluble in acetone of the condensation product from naphthanthraquinone and glycerin and thirty (30) parts of solid caustic potash dissolved in thirty (30) parts of absolute alcohol and heat the mixture for half an hour (thirty minutes) at a temperature of one hundred and fifty (150) degrees centigrade and then for another half-hour (thirty minutes) at a temperature of from one hundred and sixty-five (165) to one hundred and seventy (170) degrees centigrade. Boil the melt with water and filter. The residue can be used directly as a paste for dyeing. It dissolves in concentrated sulfuric acid, yielding an olive-green solution. With alkaline hydrosulfite it yields a reddish-brown vat with a strong fluorescence, which dyes vegetable fiber substantively giving reddish-blue shades which are extremely fast against the action of chlorin.

Example 2: Introduce five (5) parts of the condensation product from naphthanthraquinone and glycerin into a mixture of ten (10) parts of potassium hydrate and two (2) parts of anhydrous sodium acetate, while maintaining the temperature at about two hundred (200) degrees centigrade, and continue heating at this temperature for from fifteen (15) to thirty (30) minutes. Work up the melt in the manner given in Example 1. The coloring-matter obtained dyes cotton more greenish shades of blue than does the coloring-matter prepared as described in Example 1.

Now what we claim is—

1. The process for the production of anthracene coloring-matters by treating with caustic alkali a hereinbefore-defined benzanthrone compound obtainable by condensing together a naphthanthraquinone body and glycerin.

2. The process for the production of anthracene coloring-matters by treating with caustic alkali a hereinbefore-defined benzanthrone compound obtainable by condensing together naphthanthraquinone and glycerin.

3. As new articles of manufacture, the anthracene coloring-matters which can be obtained by treating with caustic alkali a benzanthrone obtainable from a naphthanthraquinone body, which coloring-matters dissolve in concentrated sulfuric acid yielding olive-green solutions, and which dissolve in alkaline hydrosulfite yielding reddish-brown vats which dye vegetable fiber substantively giving red-blue to green-blue shades.

4. As a new article of manufacture the anthracene coloring-matter which can be obtained by treating with caustic alkali the benzanthrone obtainable from naphthanthraquinone, which coloring-matter dissolves in concentrated sulfuric acid yielding an olive-green solution, and which dissolves in alkaline hydrosulfite, yielding a reddish-brown vat which dyes vegetable fiber substantively yielding blue to green-blue shades.

In testimony whereof we have hereunto set our hands in the presence of two subscribing witnesses.

OSCAR BALLY.
MAX HENRY ISLER.

Witnesses:
ERNEST F. EHRHARDT,
J. ALEC. LLOYD.